US012752645B2

(12) United States Patent
Liu et al.

(10) Patent No.: US 12,752,645 B2
(45) Date of Patent: Oct. 6, 2026

(54) CONTROL METHOD, DEVICE AND SYSTEM FOR VEHICLE CHARGING PORT COVER, AND ELECTRIC VEHICLE

(71) Applicant: GREAT WALL MOTOR COMPANY LIMITED, Baoding City (CN)

(72) Inventors: Ximing Liu, Baoding City (CN); Lu Zhang, Baoding City (CN)

(73) Assignee: GREAT WALL MOTOR COMPANY LIMITED, Baoding City (CN)

( * ) Notice: Subject to any disclaimer, the term of this patent is extended or adjusted under 35 U.S.C. 154(b) by 773 days.

(21) Appl. No.: 18/010,487

(22) PCT Filed: Sep. 28, 2021

(86) PCT No.: PCT/CN2021/121208
§ 371 (c)(1),
(2) Date: Dec. 15, 2022

(87) PCT Pub. No.: WO2022/083428
PCT Pub. Date: Apr. 28, 2022

(65) Prior Publication Data

US 2023/0234460 A1 Jul. 27, 2023

(30) Foreign Application Priority Data

Oct. 19, 2020 (CN) ......................... 202011121657.5

(51) Int. Cl.
*B60L 53/16* (2019.01)
*B62D 25/24* (2006.01)

(52) U.S. Cl.
CPC .............. *B60L 53/16* (2019.02); *B62D 25/24* (2013.01)

(58) Field of Classification Search
CPC ................................ B60L 53/16; B62D 25/24
(Continued)

(56) References Cited

U.S. PATENT DOCUMENTS 5,545,046 A 8/1996 Masuda et al.
2015/0137755 A1 5/2015 Sadano et al.
2018/0086217 A1* 3/2018 Scherdin .............. H01R 13/447

FOREIGN PATENT DOCUMENTS

CN 101778727 7/2010
CN 104577510 4/2015
(Continued)

OTHER PUBLICATIONS

Extended European Search Report for App. No. 21881846.6, dated Dec. 1, 2023 (10 pages).
(Continued)

*Primary Examiner* — Richard V Muralidar
(74) *Attorney, Agent, or Firm* — NIXON PEABODY LLP; Jeffrey L. Costellia

(57) ABSTRACT

A control method, device and system for a vehicle charging port cover, and an electric vehicle. The control method for a vehicle charging port cover is applied to a controller (101) separately connected to a fast charging port cover and a slow charging port cover. The method comprises: acquiring the open/close state of the fast charging port cover and the open/close state of the slow charging port cover (step 201); controlling the slow charging port cover to be in a locked state when the fast charging port cover is determined to be in an open state (step 202); and controlling the fast charging port cover to be in a locked state when the slow charging port cover is determined to be in an open state (step 203).

12 Claims, 6 Drawing Sheets

(58) Field of Classification Search
USPC .......................................................... 320/109
See application file for complete search history.

(56) References Cited

FOREIGN PATENT DOCUMENTS

| | | | | |
|---|---|---|---|---|
| CN | 207199970 | | 4/2018 | |
| CN | 108621819 | | 10/2018 | |
| CN | 108284766 | * | 1/2019 | |
| CN | 109969122 | | 7/2019 | |
| CN | 111532156 | | 8/2020 | |
| CN | 111703325 | | 9/2020 | |
| CN | 112373582 | | 2/2021 | |
| EP | 2 105 343 A2 | | 9/2009 | |
| EP | 2105343 B1 | * | 12/2019 | .............. B60L 53/16 |
| JP | 2020-127331 | | 8/2020 | |

OTHER PUBLICATIONS

International Search Report for Application No. PCT/CN2021/121208, mailed Jan. 5, 2022 (6 pages).
Chinese Office Action for application No. 202011121657.5, mailed Jun. 2021 (11 pages).

* cited by examiner

CONTROL METHOD, DEVICE AND SYSTEM FOR VEHICLE CHARGING PORT COVER, AND ELECTRIC VEHICLE

CROSS-REFERENCE TO RELATED APPLICATIONS

This application is a national phase of PCT application No. PCT/CN2021/121208, filed on Sep. 28, 2021, which claims the priority of the Chinese patent application filed on Oct. 19, 2020, before the China Patent Office with the application number of 202011121657.5, and the title of "CONTROL METHOD, DEVICE AND SYSTEM FOR VEHICLE CHARGING PORT COVER, AND ELECTRIC VEHICLE", which is incorporated herein by reference in their entirety.

TECHNICAL FIELD

The present disclosure relates to the technical field of vehicles, and more particularly, to a control method, device and system for a vehicle charging port cover, and an electric vehicle.

BACKGROUND

An electric vehicle refers to a vehicle which is powered by on-board power and which drives wheels through a motor. The electric vehicle has a quick charging mode and a slow charging mode. Accordingly, the electric vehicle has two kinds of charging ports, namely, a quick charging port corresponding to quick charging and a slow charging port corresponding to slow charging. Two charging modes are realized by connecting the chargers respectively to the two kinds of charging ports to charge the electric vehicle. Each charging port has a charging port cover so as to shield the charging port and realize functions such as dustproof and waterproof.

At present, the charging port covers corresponding to the two kinds of charging ports need to be electrically opened by triggering an open button, or manually opened by rotating a wrench on the charging port cover, etc. Furthermore, in terms of the structure and opening logic, there is no relationship between the quick charging port cover of the quick charging port and the slow charging port cover of the slow charging port, which results in the case that the slow charging port cover may also be opened while the quick charging port cover is opened. By the same reasoning, the quick charging port cover may also be opened while the slow charging port cover is opened, thereby increasing the probability of misoperation that a quick charging port and a slow charging port may being connected to a charger at the same time.

SUMMARY

In view of this, the present disclosure aims at proposing a control method, device and system for a vehicle charging port cover, and an electric vehicle, so as to prevent that a quick charging port and a slow charging port may be connected to a charger at the same time.

In order to achieve the above object, the technical solution of the present disclosure is achieved as follows.

A control method for a vehicle charging port cover applied to a controller respectively connected to a quick charging port cover and a slow charging port cover is disclosed, and the method includes:

acquiring an open/close state of the quick charging port cover and an open/close state of the slow charging port cover, controlling the slow charging port cover to be in a locked state in a case where it is determined that the quick charging port cover is in an open state; and controlling the quick charging port cover to be in the locked state in a case where it is determined that the slow charging port cover is in the open state.

Further, the controller is further connected to a first port cover locking unit and a second port cover locking unit, the first port cover locking unit is connected to the quick charging port cover and the second port cover locking unit is further connected to the slow charging port cover;

controlling the slow charging port cover to be in a locked state includes: transmitting a second locking instruction to the second port cover locking unit so that the second port cover locking unit controls the slow charging port cover to be in the locked state when receiving the second locking instruction; and controlling the quick charging port cover to be in the locked state includes: transmitting a first locking instruction to the first port cover locking unit so that the first port cover locking unit controls the quick charging port cover to be in the locked state when receiving the first locking instruction.

Further, the controller is further connected to a first port cover sensing unit and a second port cover sensing unit, the first port cover sensing unit is connected to the quick charging port cover and the second port cover sensing unit is further connected to the slow charging port cover;

determining that the quick charging port cover is in an open state comprises: determining that the quick charging port cover is in the open state on the condition that a first open signal is received, wherein the first open signal is a signal transmitted to the controller by the first port cover sensing unit when it is detected that the quick charging port cover is in the open state; and determining that the slow charging port cover is in the open state comprises: determining that the slow charging port cover is in the open state on the condition that a second open signal is received, wherein the second open signal is a signal transmitted to the controller by the second port cover sensing unit when it is detected that the slow charging port cover is in the open state.

Further, before acquiring an open/close state of the quick charging port cover and the open/close state of the slow charging port cover, the method further includes:

sending a first unlocking instruction to the first port cover locking unit and sending a second unlocking instruction to the second port cover locking unit on the condition that a charging port cover unlocking instruction is received; and on the condition that the charging port cover unlocking instruction is not received, sending a first locking instruction to the first port cover locking unit and a second locking instruction to the second port cover locking unit, wherein the charging port cover unlocking instruction is used for indicating that currently an electric vehicle is capable of being charged.

Further, sending a first unlocking instruction to the first port cover locking unit and sending a second unlocking instruction to the second port cover locking unit on the condition that a charging port cover unlocking instruction is received includes:

after receiving a first closing signal and a second closing signal at the same time, sending the first unlocking instruction to the first port cover locking unit and sending the second unlocking instruction to the second port cover locking unit on the condition that the charging port cover unlocking instruction is received; and on the condition that the charging port cover unlocking instruction is not received, sending a first locking instruction to the first port cover locking unit and a second locking instruction to the second port cover locking unit further includes:

after receiving the first closing signal and the second closing signal at the same time, on the condition that the charging port cover unlocking instruction is not received, sending the first locking instruction to the first port cover locking unit and the second locking instruction to the second port cover locking unit;

wherein the first closing signal is a signal transmitted to the controller by the first port cover sensing unit when it is detected that the quick charging port cover is in a close state, and the second closing signal is a signal transmitted to the controller by the second port cover sensing unit when it is detected that the slow charging port cover is in the close state.

Another object of the present disclosure is to provide a control device for a vehicle charging port cover, and the technical solutions of the present disclosure are achieved as follows:

a control device for a vehicle charging port cover applied to a controller respectively connected to a quick charging port cover and a slow charging port cover is disclosed, wherein the device includes:

an acquisition module configured for acquiring an open/close state of the quick charging port cover and an open/close state of the slow charging port cover;

a first control module configured for controlling the slow charging port cover to be in a locked state in a case where it is determined that the quick charging port cover is in an open state; and a second control module configured for controlling the quick charging port cover to be in the locked state in a case where it is determined that the slow charging port cover is in the open state.

Yet another object of the present disclosure is to provide a control system for a vehicle charging port cover, and the technical solutions of the present disclosure are achieved as follows:

a control system for a vehicle charging port cover is disclosed, wherein the system includes:

a controller, and a first port cover sensing unit, a first port cover locking unit, a second port cover sensing unit, and a second port cover locking unit respectively connected to the controller;

wherein the first port cover sensing unit is connected to a quick charging port cover, and is used for transmitting a first open signal to the controller on the condition that the quick charging port cover is in an open state;

the first port cover locking unit is connected to the quick charging port cover, and is used for controlling the quick charging port cover to be in a locked state on the condition that a first locking instruction transmitted by the controller is received;

the second port cover sensing unit is connected to a slow charging port cover, and is used for detecting an open/close state of the slow charging port cover and transmitting the open/close state of the slow charging port cover to the controller;

the second port cover locking unit is connected to the slow charging port cover, and is used for transmitting a second open signal to the controller on the condition that the slow charging port cover is in an open state; and the controller is used for transmitting a second locking instruction to the second port cover locking unit on the condition that the first open signal is received, and for transmitting a first locking instruction to the first port cover locking unit on the condition that the second open signal is received.

Further, the first port cover sensing unit includes: a first resistor, a second resistor, and a first micro-switch clamped with the quick charging port cover, wherein the first micro-switch is connected in parallel to the first resistor, and the main circuit at one end of the first micro-switch is grounded, and the second resistor is located on the main circuit at the other end of the first micro-switch, and the open/close state of the quick charging port cover is transmitted to the controller via the main circuit at the other end of the first micro-switch; and the second port cover sensing unit comprises: a third resistor, a fourth resistor, and a second micro-switch clamped with the slow charging port cover, wherein the second micro-switch is connected in parallel to the third resistor, and the main circuit at one end of the second micro-switch is grounded, and the fourth resistor is located on the main circuit at the other end of the second micro-switch, and the open/close state of the slow charging port cover is transmitted to the controller via the main circuit at the other end of the second micro-switch.

Further, the first port cover locking unit includes a fifth resistor, and a first charging port cover motor connected to the quick charging port cover, wherein the first charging port cover motor is connected in parallel to the fifth resistor, and is used for rotating in a first direction for a specified duration to control the quick charging port cover to be in an unlocked state when a first unlocking instruction is received, and for rotating in a second direction for a specified duration to control the quick charging port cover to be in a locked state on the condition that a first locking instruction is received, wherein the first direction and the second direction are opposite; and the second port cover locking unit comprises a sixth resistor, and a second charging port cover motor connected to the slow charging port cover, wherein the second charging port cover motor is connected in parallel to the sixth resistor, and is used for rotating in the first direction for a specified duration to control the slow charging port cover to be in the unlocked state on the condition that a second unlocking instruction is received, and for rotating in the second direction for a specified duration to control the slow charging port cover to be in the locked state on the condition that a second locking instruction is received.

A further object of the present disclosure is to propose an electric vehicle, and the technical solution of the present disclosure is achieved as follows: an electric vehicle is disclosed, wherein the electric vehicle includes any of the systems for a vehicle charging port cover provided by the present disclosure.

Embodiments of the present disclosure provide a control method for a vehicle charging port cover that, by acquiring the open/close state of the quick charging port cover and the open/close state of the slow charging port cover, enables a controller to control a quick charging port cover to be in a locked state in the case where it is determined that the quick charging port cover is in an open state. In the case where it is determined that the slow charging port cover is in the open state, the slow charging port cover is controlled to be in the locked state. Therefore, when the quick charging port cover is in the open state, the slow charging port cover is in a locked state and cannot be opened. When the slow charging port cover is in the open state, the quick charging port cover is in a locked state and cannot be opened. It prevents the scenario that a quick charging port and a slow charging port can be connected to a charger at the same time, and avoids the misoperation of a quick charging port and a slow charging port being connected to a charger at the same time. Furthermore, the charging interruption of the electric vehicle caused by the quick charging port and a slow charging port being connected to a charger at the same time is avoided such that the unnecessary charging interruption of the electric vehicle is reduced, which improves the user experience.

The control device for a vehicle charging port cover, the control system for a vehicle charging port cover, and the electric vehicle have the same advantages as the above-described control method for a vehicle charging port cover with respect to the prior art, and the description of the same will not be repeated herein.

BRIEF DESCRIPTION OF THE DRAWINGS

The accompanying drawings constituting a part of the present disclosure are used to provide a further understanding of the present disclosure. The schematic embodiments of the present disclosure and descriptions thereof are used to explain the present disclosure and do not constitute an improper limitation of the present disclosure. In the drawings.

DETAILED DESCRIPTION OF THE EMBODIMENTS

It needs to be noted that embodiments and features of embodiments in the present disclosure may be combined with each other without conflict. The present disclosure will be described below in detail in connection with embodiments with reference to the accompanying drawings.

Figure 1:
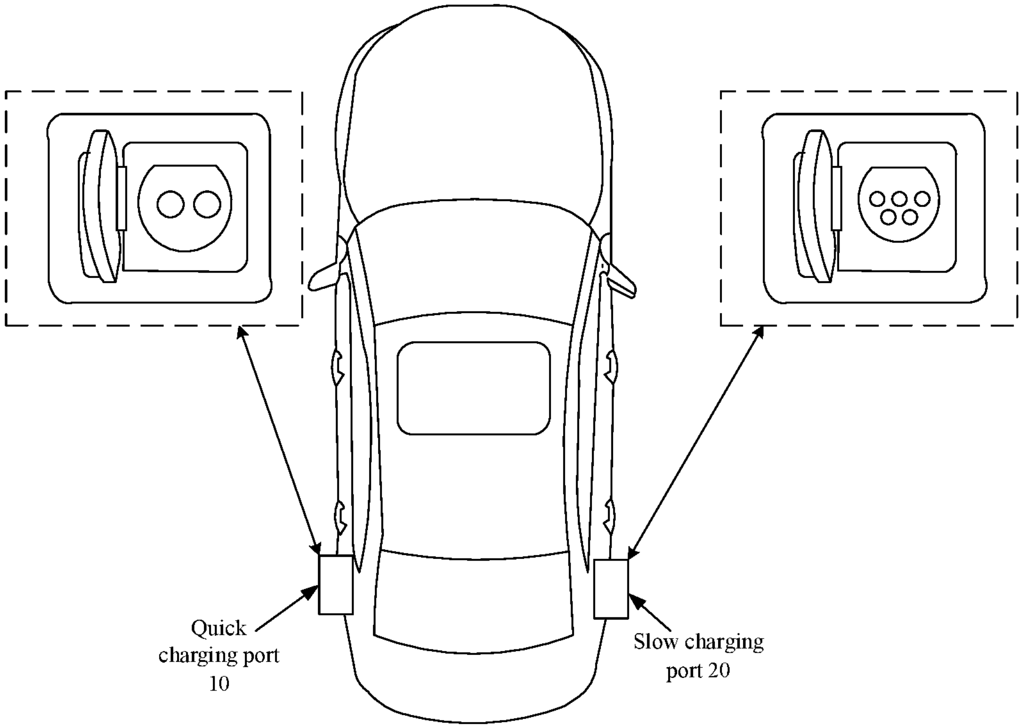
FIG. 1 is a schematic structural diagram of an electric vehicle provided by an embodiment of the present disclosure.
Figure 2:
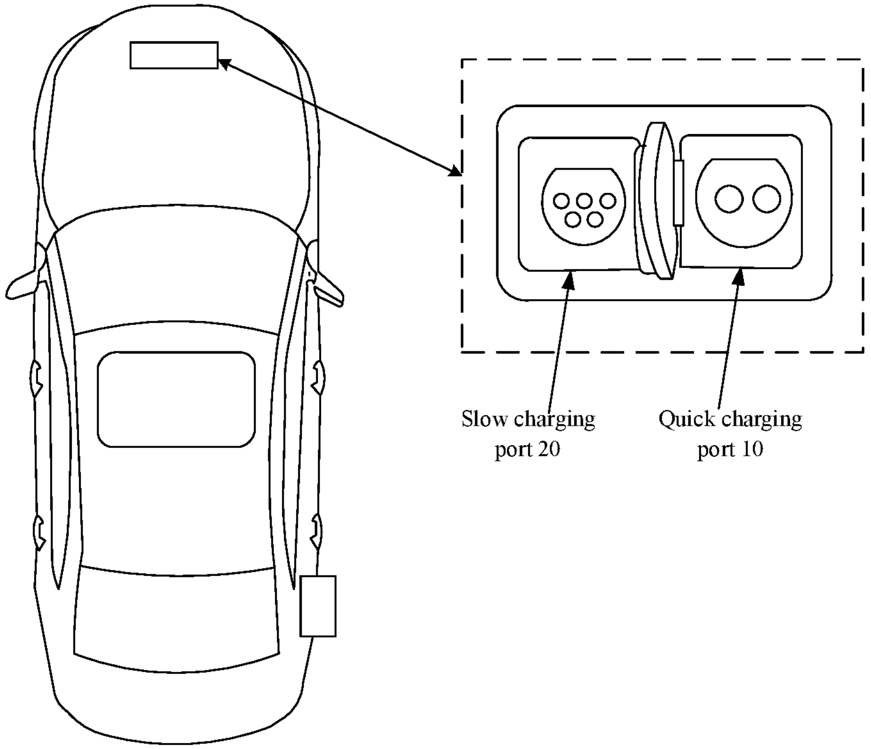
FIG. 2 is a schematic structural diagram of another electric vehicle provided by an embodiment of the present disclosure.

An electric vehicle, also referred to as a battery electric vehicle, refers to a vehicle powered by on-board power and driving wheels through a motor. The electric vehicle has a quick charging mode and a slow charging mode. Accordingly, the electric vehicle has two kinds of charging ports, namely, a quick charging port corresponding to quick charging and a slow charging port corresponding to slow charging. Two charging modes are realized by connecting the chargers respectively to the two kinds of charging ports to charge the electric vehicle. The two kinds of charging ports may be respectively located at different positions on the vehicle body of the electric vehicle as shown in FIG. 1. For example, the quick charging port 10 is located on the left side of the vehicle body and the slow charging port 20 is located on the right side of the vehicle body. Alternatively, the two kinds of charging ports may further be co-located at one position of the vehicle body as shown in FIG. 2, i.e., the two kinds of charging ports are integrated. For example, both the quick charging port 10 and the slow charging port 20 are located at the front hatchcover of the vehicle head. However, when both the quick charging port and the slow charging port are located at the front hatchcover of the vehicle head, it is easy to increase the maintenance cost once a problem occurs. Therefore, the arrangement that two kinds of charging ports respectively located at different positions of the vehicle body of an electric vehicle is common. Each charging port has one charging port cover connected to the charging port so as to shield the charging port and realize functions such as dustproof and waterproof.

Figure 3:
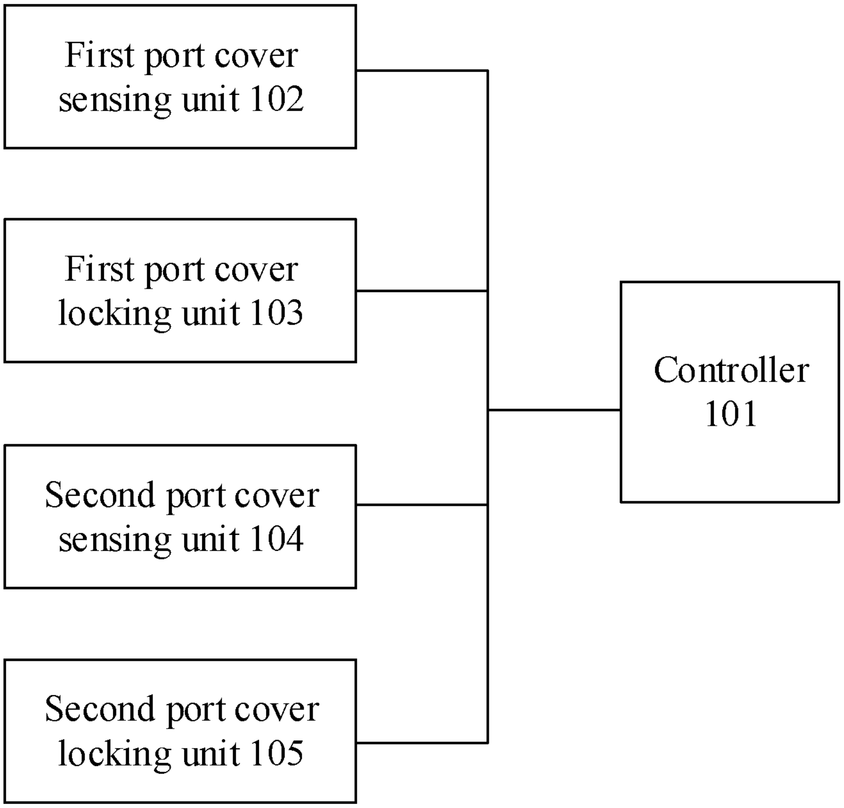
FIG. 3 is a schematic structural diagram of a control system for a vehicle charging port cover according to an embodiment of the present disclosure.

Referring to FIG. 3, it shows a schematic structural diagram of a control system for a vehicle charging port cover according to an embodiment of the present disclosure. The control system for a vehicle charging port cover includes:

a controller 101, and a first port cover sensing unit 102, a first port cover locking unit 103, a second port cover sensing unit 104, and a second port cover locking unit 105 respectively connected to the controller 101.

The first port cover sensing unit 102 is connected to the quick charging port cover, and is used for detecting an open/close state of the quick charging port cover. The first port cover sensing unit 102 is used for transmitting a first open signal to the controller on the condition that the quick charging port cover is in an open state.

The first port cover locking unit 103 is connected to the quick charging port cover and is used for controlling the quick charging port cover to be in a locked state on the condition that a first locking instruction transmitted from the controller 101 is received.

The second port cover sensing unit 104 is connected to the slow charging port cover and is used for detecting the open/close state of the slow charging port cover. The second port cover sensing unit 104 is used for transmitting a second open signal to the controller on the condition that the slow charging port cover is in an open state. Optionally, the first open signal and the second open signal may both be a voltage signal or a current signal. As an example, the first open signal and the second open signal may be a 12V voltage signal.

The second port cover locking unit 105 is connected to the slow charging port cover and is used for controlling the slow charging port cover to be in a locked state on the condition that a second locking instruction transmitted from the controller 101 is received.

The controller 101 is configured to transmit a second locking instruction to the second port cover locking unit 105 on the condition that the first open signal is received, and to transmit the first locking instruction to the first port cover locking unit 103 on the condition that the second open signal is received. Illustratively, the controller 101 may be a body control module (BCM) of an electric vehicle.

An embodiment of the present disclosure provides a control system for a vehicle charging port cover. The first port cover sensing unit transmits a second open signal to a controller when a slow charging port cover is in an open state, and the second port cover sensing unit is used for transmitting the second open signal to the controller when the slow charging port cover is in the open state so that the controller can determine that the quick charging port cover is in the open state when receiving the first open signal, and transmits the second locking instruction to the second port cover locking unit. At that, the second port cover locking unit controls the quick charging port cover to be in a locked state after receiving the second locking instruction. And the controller, when receiving the second open signal, may determine that the slow charging port cover is in an open state, and transmit the first locking instruction to the first port cover locking unit, so that the first port cover locking unit, after receiving the first locking instruction, controls the slow charging port cover to be in a locked state. Therefore, when the quick charging port cover is in the open state, the slow charging port cover is in a locked state and cannot be opened. When the slow charging port cover is in the open state, the quick charging port cover is in a locked state and cannot be opened. It prevents the scenario that a quick charging port and a slow charging port can be connected to a charger at the same time, and avoids the misoperation of a quick charging port and a slow charging port being connected to a charger at the same time. Furthermore, the charging interruption of the electric vehicle caused by a quick charging port and a slow charging port being connected to a charger at the same time is avoided such that the unnecessary charging interruption of the electric vehicle is reduced, and the user experience is improved.

Optionally, the first port cover locking unit 103 is further configured to control the quick charging port cover to be in an unlocked state when receiving a first unlocking instruction transmitted by the controller 101. The second port cover locking unit 105 is also used to control the slow charging port cover to be in an unlocked state when a second unlocking instruction transmitted by the controller is received.

The controller 101 is further configured to send a first unlocking instruction to the first port cover locking unit 103 and a second unlocking instruction to the second port cover locking unit 105 when receiving the charging port cover unlocking instruction. When the charging port cover unlocking instruction is not received, a first locking instruction is sent to the first port cover locking unit 103 and a second locking instruction is sent to the second port cover locking unit 105, wherein the charging port cover unlocking instruction is used for indicating that currently the electric vehicle can be charged. The charging port cover unlocking instruction may be a vehicle body anti-theft deactivating instruction, or may be an unlocking instruction for only the charging port cover (including the quick charging port cover and the slow charging port cover). The vehicle body anti-theft deactivating instruction refers to an instruction for deactivating the anti-theft system. The charging port cover unlocking instruction may be triggered by manually pressing a specific button. For example, an unlock button for a charging port cover is provided in a vehicle, and the unlock button is manually pressed to trigger a vehicle control unit (VCU) to generate an unlocking instruction, and the unlocking instruction is sent to a controller.

Further alternatively, the first port cover sensing unit 102 is also configured to transmit a first closing signal to the controller when the quick charging port cover is in a close state. The second port cover sensing unit 104 is also configured to transmit a second closing signal to the controller when the slow charging port cover is in the close state. Alternatively, the first closing signal and the second closing signal may both be a voltage signal or a current signal. As an example, the first closing signal and the second closing signal may be a 9V voltage signal.

The controller 101 is further configured to confirm whether the charging port cover unlocking instruction is received when receiving the first closing signal and the second closing signal.

Figure 4:
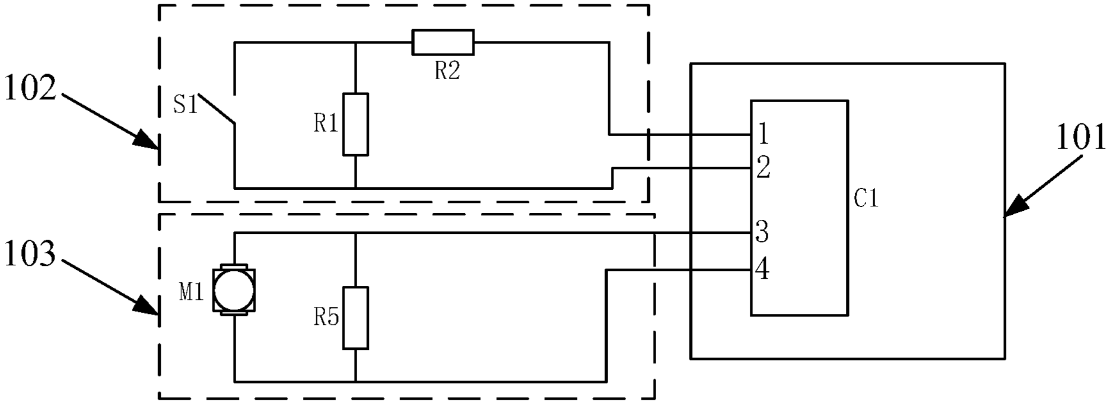
FIG. 4 is a schematic partial structural diagram of a control system for a vehicle charging port cover according to an embodiment of the present disclosure.

In an embodiment of the present disclosure, as shown in FIG. 4, the first port cover sensing unit 102 may include: a first resistor R1, a second resistor R2, and a first micro-switch S1 clamped to the quick charging port cover. The first micro-switch S1 is connected in parallel to the first resistor R1, the main circuit at one end of the first micro-switch S1 is grounded, the second resistor R2 is located on the main circuit at the other end of the first micro-switch S1, and the open/close state of the quick charging port cover is transmitted to the controller 101 via the main circuit at the other end of the first micro-switch S1. The first micro-switch is one trigger switch of the quick charging port cover. When the quick charging port cover is in the unlocked state, the quick charging port cover can be opened by pressing the first micro-switch. At this time, the first port cover sensing unit determines that the quick charging port cover is in the open state, and transmits the open state to the controller. The first micro-switch is reset by closing the quick charging port cover. At this time, the first port cover sensing unit determines that the quick charging port cover is in the close state, and transmits the close state to the controller.

Further, with continued reference to FIG. 4, the first port cover locking unit 103 may include: a fifth resistor R5, and a first charging port cover motor M1 connected to the quick charging port cover. The first charging port cover motor M1 is connected in parallel to the fifth resistor R5, and is used for rotating in a first direction for a specified duration to control the quick charging port cover to be in an unlocked state when the first unlocking instruction is received. When the first charging port cover motor M1 receives the first locking instruction, the first charging port cover motor M1 rotates in the second direction for a specified duration to control the quick charging port cover to be in the locked state. The first direction and the second direction are opposite. When the first charging port cover motor rotates in the second direction, a pulling force is applied to the quick charging port cover, so that the quick charging port cover is pressed in the direction toward the quick charging port and the quick charging port cover cannot be opened. When the first charging port cover motor rotates in the first direction, the pulling force applied to the quick charging port cover is released, so that the pressing of the quick charging port cover is reduced in the direction of the quick charging port and the quick charging port cover can be opened. As an example, the first direction may be a direction in which the first charging port cover motor rotates forward, and correspondingly, the second direction may be a direction in which the first charging port cover motor rotates reversely.

As an example, the controller 101 includes a first chip C1. The first chip C1 may include a first pin 1, a second pin 2, a third pin 3, and a fourth pin 4. The first pin 1 is an input pin, and the third pin 3 and the fourth pin 4 are output pins. The first micro-switch S1 of the first port cover sensing unit 102 may include a first interface and a second interface. The first interface of the first micro-switch S1 and one end of the first resistor R1 are both connected to one end of the second resistor R2, and the other end of the second resistor R2 is connected to the first pin 1 of the first chip C1. The first interface of the first micro-switch S1 and the other end of the first resistor R1 are both connected to the second pin 2 of the first chip C1. The second pin 2 is grounded. The first port cover sensing unit transmits a first open signal to the first pin when it is detected that the quick charging port cover is in an open state. The first closing signal is transmitted to the second pin when it is detected that the quick charging port cover is in the close state.

The third pin 3 and the fourth pin 4 are output pins for controlling the first charging port cover motor M1 in the first port cover locking unit 103. One end of the first charging port cover motor M1 and one end of the fifth resistor R5 are both connected to the third pin 3, and the other end of the first charging port cover motor M1 and the other end of the fifth resistor R5 are both connected to the fourth pin 4. The first locking instruction or the first unlocking instruction is sent to the first charging port cover motor M1 through the third pin 3 and the fourth pin 4. The first locking instruction or the first unlocking instruction may successively be a first locking signal or a first unlocking signal. The first locking signal and the first unlocking signal may be electrical signals. The electrical signal may be a current signal or a voltage signal. Then, the controller 101 may control the third pin 3 and the fourth pin 4 to output the first locking signal to the first charging port cover motor Ml.

In an embodiment of the present disclosure, the first unlocking signal may include a first unlocking and rotating signal and a first stop signal. The controller may transmit a first unlocking and rotating signal to the first charging port cover motor M1 through the third pin 3 and the fourth pin 4 so that the first charging port cover motor M1 rotates in the first direction. After a specified duration, a first stop signal is transmitted to the first charging port cover motor M1 via the third pin 3 and the fourth pin 4, so that the first charging port cover motor M1 stops rotating, and it is achieved that the quick charging port cover is in an unlocked state.

Accordingly, the first locking signal may also include a first locking and rotating signal and a first stop signal. The controller may transmit the first locking and rotating signal to the first charging port cover motor Ml through the third pin 3 and the fourth pin 4 so that the first charging port cover motor Ml rotates in the second direction. After a specified duration, a first stop signal is transmitted to the first charging port cover motor M1 via the third pin 3 and the fourth pin 4, so that the first charging port cover motor M1 stops rotating, and it is achieved that the quick charging port cover is in a locking state. As an example, the first unlocking and rotating signal may include a positive voltage signal transmitted by the third pin and a negative voltage signal transmitted by the fourth pin. The first locking and rotating signal may include a negative voltage signal transmitted by the third pin and a positive voltage signal transmitted by the fourth pin.

Figure 5:
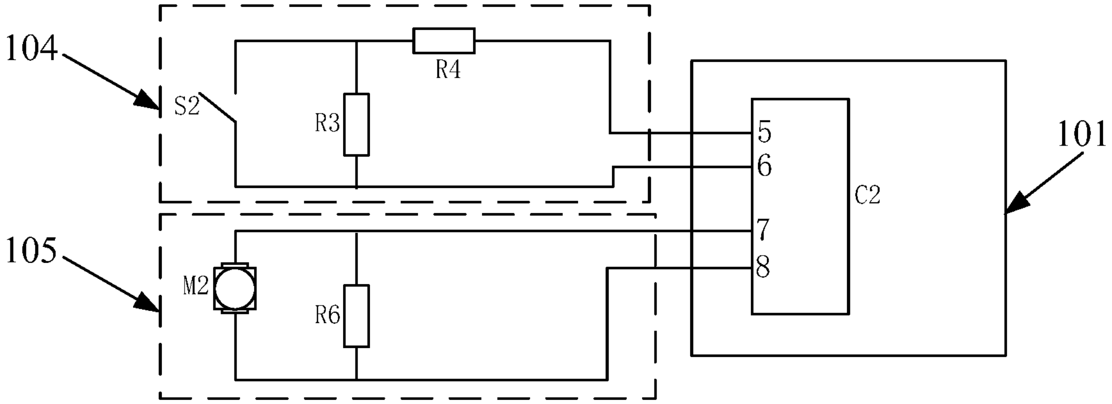
FIG. 5 is a schematic partial structural diagram of another control system for a vehicle charging port cover according to an embodiment of the present disclosure.

As shown in FIG. 5, the second port cover sensing unit 104 may include: a third resistor R3, a fourth resistor R4, and a second micro-switch S2 clamped with the slow charging port cover. The second micro-switch S2 is connected in parallel to the third resistor R3, the main circuit at one end of the second micro-switch S2 is grounded, the fourth resistor R4 is located on the main circuit at the other end of the second micro-switch S2, and the open/close state of the slow charging port cover is transmitted to the controller 101 via the main circuit at the other end of the second micro-switch S2. Similar to the first port cover sensing unit 104 described above, the second micro-switch is one trigger switch for a slow charging port cover. When the slow charging port cover is in the unlocked state, the slow charging port cover can be opened by pressing the second micro-switch. At this time, the second port cover sensing unit determines that the slow charging port cover is in the open state, and transmits the open state to the controller. The second micro-switch is reset by closing the slow charging port cover, and at this time, the second port cover sensing unit determines that the slow charging port cover is in the close state, and transmits the close state to the controller.

Further, with continued reference to FIG. 5, the second port cover locking unit 105 may include: a sixth resistor R6, and a second charging port cover motor M2 connected to the slow charging port cover. The second charging port cover motor M2 is connected in parallel to the sixth resistor R6, and is used for rotating in the first direction for a specified duration to control the slow charging port cover to be in the unlocked state when the second unlocking instruction is received. The second charging port cover motor M2 is used to rotate in the second direction for a specified duration to control the slow charging port cover to be in the locked state when the second locking instruction is received. When the second charging port cover motor rotates in the second direction, a pulling force is applied to the slow charging port cover, so that the slow charging port cover is pressed in the direction toward the slow charging port, and the slow charging port cover cannot be opened. When the second charging port cover motor rotates in the first direction, the pulling force applied to the slow charging port cover is released, so that the pressing of the slow charging port cover is reduced in the direction toward the slow charging port, and the slow charging port cover can be opened.

As an example, the controller 101 includes a second chip C2. The second chip C2 may include a fifth pin 5, a sixth pin 6, a seventh pin 7, and an eighth pin 8. The fifth pin 5 is an input pin, and the seventh pin 7 and the eighth pin 8 are output pins. The second micro-switch S2 of the second port cover sensing unit 104 may include a first interface and a second interface. The first interface of the second micro-switch S2 and one end of the third resistor R3 are both connected to one end of the fourth resistor R4, and the other end of the third resistor R3 is connected to the fifth pin 5 of the second chip C2. The first interface of the second micro-switch S2 and the other end of the third resistor R3 are both connected to the sixth pin 6 of the second chip C2. The sixth pin 6 is grounded. The second port cover sensing unit transmits the second open signal to the fifth pin when it is detected that the slow charging port cover is in an open state. When it is detected that the slow charging port cover is in the close state, the second closing signal is transmitted to the fifth pin.

The seventh pin 7 and the eighth pin 8 are output pins for controlling the second charging port cover motor M2 in the second port cover locking unit 105. One end of the second charging port cover motor M2 and one end of the sixth resistor R6 are both connected to the seventh pin 7, and the other end of the second charging port cover motor M2 and the other end of the sixth resistor R6 are both connected to the eighth pin 8. The second locking instruction or the second unlocking instruction is sent to the second charging port cover motor M2 through the seventh pin 7 and the eighth pin 8. The second locking instruction or the second unlocking instruction may further successively be a second locking signal or a second unlocking signal, the second locking signal and the second unlocking signal may be a current signal or a voltage signal.

In an embodiment of the present disclosure, the second unlocking signal may include a second unlocking and rotating signal and a second stop signal. The controller may transmit the second unlocking and rotating signal to the second charging port cover motor M2 through the seventh pin 7 and the eighth pin 8 so that the second charging port cover motor M2 rotates in the first direction. After a specified duration, the second stop signal is transmitted to the second charging port cover motor M2 via the seventh pin 7 and the eighth pin 8 so that the second charging port cover motor M2 stops rotating, and it is achieved that the slow charging port cover is in an unlocked state. Accordingly, the second locking signal may also include a second locking and rotating signal and a second stop signal. The controller may transmit the second locking and rotating signal to the second charging port cover motor M2 through the seventh pin 7 and the eighth pin 8 so that the second charging port cover motor M2 rotates in the second direction. After a specified duration, the second stop signal is transmitted to the second charging port cover motor M2 via the seventh pin 7 and the eighth pin 8, so that the second charging port cover motor M2 stops rotating, and it is achieved that the slow charging port cover is in the locking state. As an example, the second unlocking and rotating signal may include a positive voltage signal transmitted by the seventh pin and a negative voltage signal transmitted by the eighth pin. The second locking and rotating signal may include the negative voltage signal transmitted by the seventh pin and the positive voltage signal transmitted by the eighth pin.

In an embodiment of the present disclosure, a port cover sensing unit (including the first port cover sensing unit and the second port cover sensing unit) may be used to feedback the actual charging port cover state, including an open state and a close state. The charging port cover motor in the port cover locking unit (including the first port cover locking unit and the second port cover locking unit) may be used to control the charging port cover to be in a locking state or an unlocked state. In the "armed" state of a vehicle, that is, the controller does not receive the charging port cover unlocking instruction, and the charging port cover is locked by the charging port cover motor, when the micro-switch in the port cover sensing unit is pressed, the charging port cover will not open. In the "disarmed" state of a vehicle, that is, after the controller receives the charging port cover unlocking instruction, and the charging set port cover is unlocked, after the micro-switch is pressed, the charging port cover can be opened. When the quick charging port cover is opened, the slow charging port cover is controlled to be locked. The quick charging port cover is controlled to be locked when the slow charging port cover is open.

In summary, the embodiment of the present disclosure provides a control system for a vehicle charging port cover. The first port cover sensing unit transmits a second open signal to a controller when a slow charging port cover is in an open state, and the second port cover sensing unit is used for transmitting the second open signal to the controller when the slow charging port cover is in the open state, so that the controller may determine that the quick charging port cover is in the open state when receiving the first open signal, and transmits the second locking instruction to the second port cover locking unit. At that, the second port cover locking unit controls the quick charging port cover to be in a locked state after receiving the second locking instruction. And the controller, when receiving the second open signal, may determine that the slow charging port cover is in an open state, and transmit the first locking instruction to the first port cover locking unit, so that the first port cover locking unit, after receiving the first locking instruction, controls the slow charging port cover to be in a locked state. Therefore, when the quick charging port cover is in the open state, the slow charging port cover is in a locked state and cannot be opened. When the slow charging port cover is in the open state, the quick charging port cover is in a locked state and cannot be opened. It prevents the scenario that a quick charging port and a slow charging port may be connected to a charger at the same time, and avoids the misoperation of a quick charging port and a slow charging port being connected to a charger at the same time. Furthermore, the charging interruption of the electric vehicle caused by a quick charging port and a slow charging port being connected to a charger at the same time is avoided such that the unnecessary charging interruption of the electric vehicle is reduced, and the user experience is improved.

The control system for a vehicle charging port cover provided by an embodiment of the present disclosure may be applied to the control method for a vehicle charging port cover described below. The workflow and working principle of the respective components in the embodiments of the present disclosure may be cross-referenced with the description of the respective embodiments described below.

Figure 6:
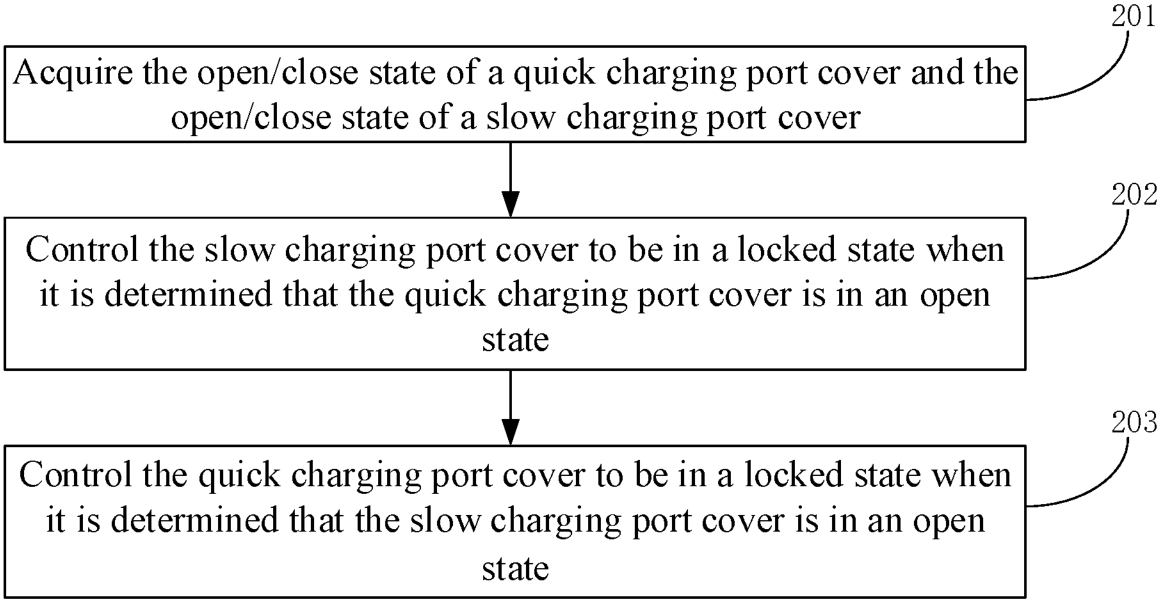
FIG. 6 is a schematic flow chart of a control method for a vehicle charging port cover according to an embodiment of the present disclosure.

Referring to FIG. 6, a flow chart of a control method for a vehicle charging port cover provided by an embodiment of the present disclosure is shown. The control method for a vehicle charging port cover may be applied to a controller respectively connected to a quick charging port cover and a slow charging port cover. The controller may be the controller in any of the systems in the above-mentioned FIG. 3 to FIG. 5. The method includes:

step 201, acquiring the open/close state of a quick charging port cover and an open/close state of a slow charging port cover.

Alternatively, the controller may acquire the first open signal transmitted by the first port cover sensing unit. The first open signal is a signal transmitted to the controller by the first port cover sensing unit when it is detected that the quick charging port cover is in the open state. The controller may also acquire a second open signal transmitted by the second port cover sensing unit. The second open signal is a signal transmitted to the controller by the second port cover sensing unit when it is detected that the slow charging port cover is in the open state.

Step 202, controlling the slow charging port cover to be in a locked state when it is determined that the quick charging port cover is in an open state.

Alternatively, the controller may determine whether the quick charging port cover is in an open state by determining whether the received signal transmitted by the first port cover sensing unit is a first open signal. The process of determining that the quick charging port cover is in the open state may include: when the received signal is the first open signal, determining that the quick charging port cover is in the open state. Therefore, when the quick charging port cover is in the open state, the slow charging port cover is controlled to be in the locked state. The process of controlling the slow charging port cover to be in the locked state may include: transmitting a second locking instruction to a second port cover locking unit so that the second port cover locking unit controls the slow charging port cover to be in a locked state when receiving the second locking instruction, so as to achieve slow charging port cover locking.

Step 203, controlling the quick charging port cover to be in a locked state when it is determined that the slow charging port cover is in an open state.

Alternatively, the controller may determine whether the slow charging port cover is in an open state by determining whether the received signal transmitted from the second port cover sensing unit is a second open signal. The process of determining that the slow charging port cover is in the open state may include: when the received signal is the second open signal, determining that the slow charging port cover is in the open state. Therefore, when the slow charging port cover is in the open state, the quick charging port cover is controlled to be in the locked state. The process of controlling the quick charging port cover to be in a locked state may include: transmitting a first locking instruction to the first port cover locking unit so that the first port cover locking unit controls the quick charging port cover to be in a locked state when receiving the first locking instruction so as to lock the quick charging port cover.

In summary, the embodiment of the present disclosure provides a control method for a vehicle charging port cover, by acquiring the open/close state of the quick charging port cover and the open/close state of the slow charging port cover, when it is determined that the quick charging port cover is in the open state, the slow charging port cover is controlled to be in the locked state. When it is determined that the slow charging port cover is in the close state, the quick charging port cover is controlled to be in the locked state. Therefore, when the quick charging port cover is in the open state, the slow charging port cover is in a locked state and cannot be opened. When the slow charging port cover is in the open state, the quick charging port cover is in a locked state and cannot be opened. It prevents the scenario that a quick charging port and a slow charging port can be connected to a charger at the same time, and avoids the misoperation of a quick charging port and a slow charging port being connected to a charger at the same time. Furthermore, the charging interruption of the electric vehicle caused by a quick charging port and a slow charging port being connected to a charger at the same time is avoided such that the unnecessary charging interruption of the electric vehicle is reduced, and the user experience is improved.

Figure 7:
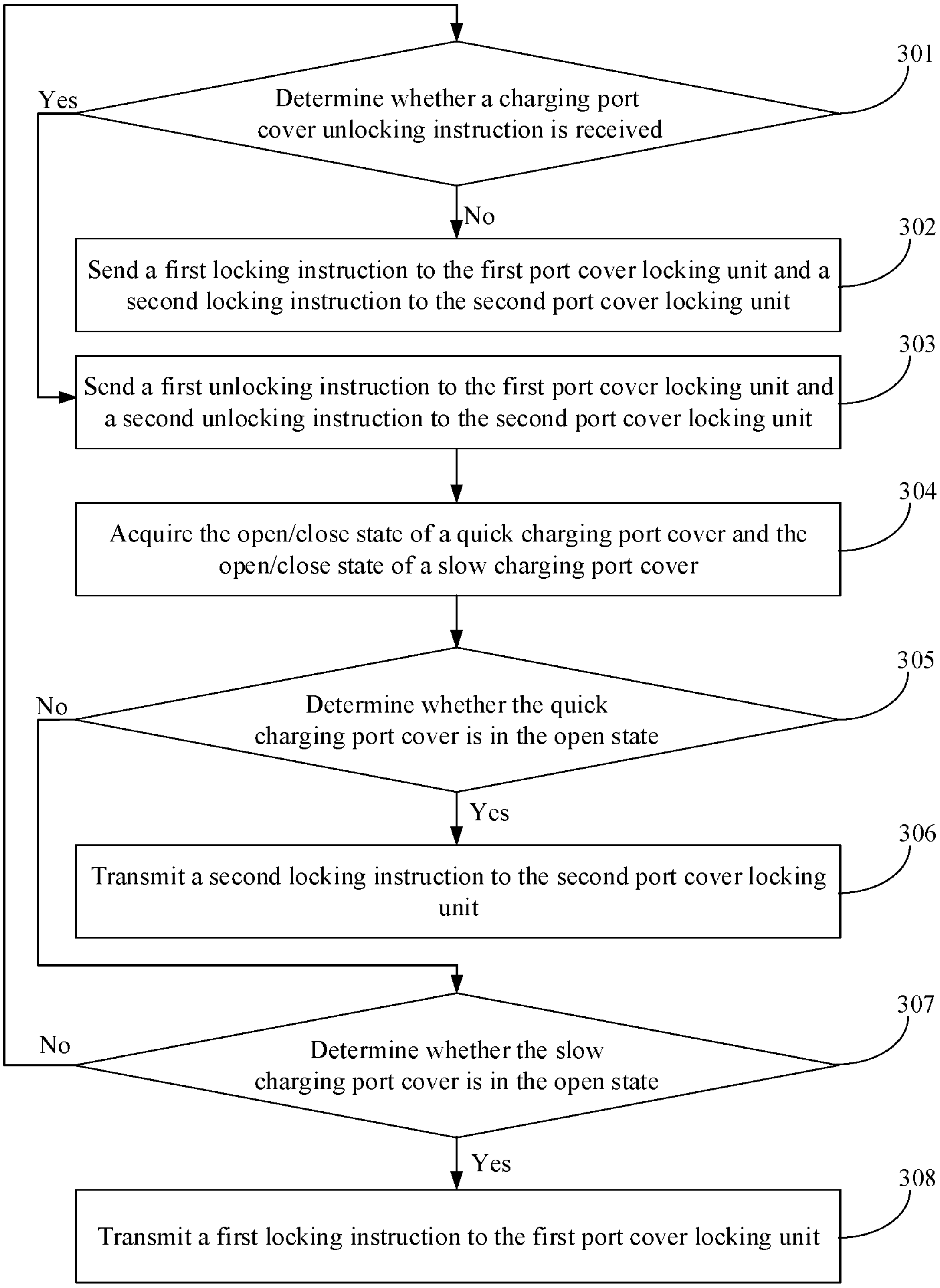
FIG. 7 is a schematic flow chart of another control method for a vehicle charging port cover according to an embodiment of the present disclosure.

Referring to FIG. 7, a flow chart of a control method for a vehicle charging port cover provided by an embodiment of the present disclosure is shown. The control method for a vehicle charging port cover may be applied to a controller respectively connected to a quick charging port cover and a slow charging port cover. The controller may be the controller in any of the systems in the above-mentioned FIG. 3 to FIG. 5. An embodiment of the present disclosure is described by taking an example in which the control method for a vehicle charging port cover is applied to any one of the systems of FIGS. 3 to 5. The method includes:

step 301, determining whether a charging port cover unlocking instruction is received or not. When the charging port cover unlocking instruction is not received, step 302 is executed; when the charging port cover unlocking instruction is received, step 303 is executed.

The charging port cover unlocking instruction is used to indicate that the electric vehicle can be charged currently. The charging port cover unlocking instruction may be a vehicle body anti-theft deactivating instruction, or may be an unlocking instruction for only the charging port cover. The vehicle body anti-theft deactivating instruction refers to an instruction for deactivating the anti-theft system. The charging port cover unlocking instruction may be triggered by manually pressing a specific button. For example, an unlock button for a charging port cover is provided in a vehicle, and the unlock button is manually pressed to trigger the VCU to generate an unlocking instruction, and the unlocking instruction is sent to a controller.

Alternatively, the controller may periodically determine whether the charging port cover unlocking instruction is received when both the quick charging port cover and the slow charging port cover are in the locked state. When the charging port cover unlocking instruction is received, it indicates that, currently, both the quick charging port cover and slow charging port cover are in the unlocked state and can be opened. When the charging port cover unlocking instruction is not received, it indicates that, currently, both the quick charging port cover and the slow charging port cover are in the locked state and cannot be opened.

Step 302, sending a first locking instruction to the first port cover locking unit and a second locking instruction to the second port cover locking unit.

The controller sends the first locking instruction to the first port cover locking unit so that the first port cover locking unit controls the quick charging port cover to be in the locked state when the first locking instruction is received. The controller sends the second locking instruction to the second port cover locking unit so that the second port cover locking unit controls the slow charging port cover to be in the locked state when receiving the second locking instruction.

As an example, taking the system illustrated in FIGS. 4 and 5 described above as an example, the first locking instruction and the second locking instruction may be a first locking signal and a second locking signal in sequence. The first locking signal and the second locking signal are electrical signals, which may be a current signal or a voltage signal.

The process of sending the first locking instruction to the first port cover locking unit by the controller may include: controlling the third pin and the fourth pin of the first chip to output the first locking signal.

The process of sending the second locking instruction to the second port cover locking unit by the controller may include: controlling the third pin and the fourth pin of the first chip to output the second locking signal.

Step 303, sending a first unlocking instruction to the first port cover locking unit and a second unlocking instruction to the second port cover locking unit.

The controller sends the first unlocking instruction to the first port cover locking unit so that the first port cover locking unit controls the quick charging port cover to be in the unlocked state when the first locking instruction is received. The controller sends the second unlocking instruction to the second port cover locking unit so that the second port cover locking unit controls the slow charging port cover to be in the unlocked state when receiving the second locking instruction.

As an example, taking the system shown in FIGS. 4 and 5 described above as an example, the first unlocking instruction and the second unlocking instruction may sequentially be a first unlocking signal and a second unlocking signal. The first unlocking signal and the second unlocking signal are electrical signals, which may be a current signal or a voltage signal.

The process of sending a first unlocking instruction to the first port cover locking unit by the controller may include:

controlling the third pin and the fourth pin of the first chip to output the first unlocking signal.

The process of sending the second unlocking instruction to the second port cover locking unit by the controller may include: controlling the third pin and the fourth pin of the first chip to output the second unlocking signal.

Step 304, acquiring the open/close state of the quick charging port cover and the open/close state of the slow charging port cover.

Alternatively, the open/close state of the quick charging port cover transmitted by the first port cover sensing unit and the open/close state of the slow charging port cover transmitted by the second port cover sensing unit are acquired. The open/close state of the quick charging port cover and the open/close state of the slow charging port cover can be characterized by different signals. The controller may acquire the first open signal and the first closing signal transmitted by the first port cover sensing unit. The first open signal is a signal transmitted to the controller by the first port cover sensing unit when it is detected that the quick charging port cover is in the open state. The first closing signal is a signal transmitted to the controller by the first port cover sensing unit when it is detected that the quick charging port cover is in the close state.

The controller may also acquire a second open signal and a second closing signal transmitted by the second port cover sensing unit. The second open signal is a signal transmitted to the controller by the second port cover sensing unit when it is detected that the slow charging port cover is in the open state. The second closing signal is a signal transmitted to the controller by the second port cover sensing unit when it is detected that the slow charging port cover is in the close state.

Step 305, determining whether the quick charging port cover is in the open state. In the case where it is determined that the quick charging port cover is in the open state, step 306 is executed; in the case where it is determined that the quick charging port cover is not in the open state, step 307 is executed.

Alternatively, the controller may determine whether the received signal transmitted by the first port cover sensing unit is a first open signal or a first closing signal. When it is determined that the received signal is the first open signal, it is determined that the quick charging port cover is in the open state. When it is determined that the received signal is the first closing signal, it is determined that the quick charging port cover is in the close state.

Step 306, transmitting a second locking instruction to the second port cover locking unit.

When it is determined that the quick charging port cover is in the open state, the slow charging port cover needs to be locked at this time. The controller may then transmit a second locking instruction to the second port cover locking unit such that the second port cover locking unit, upon receiving the second locking instruction, controls the slow charging port cover to be in the locked state. As an example, continuing to take the example shown in step 303 above as an example, the process of sending the second locking instruction to the second port cover locking unit by the controller may include: controlling the third pin and the fourth pin of the first chip to output the second locking signal.

Step 307, determining whether the slow charging port cover is in an open state. In the case where it is determined that the slow charging port cover is in the open state, step 308 is executed; in the case where it is determined that the slow charging port cover is not in the open state, step 301 is performed.

After determining that the quick charging port cover is not in the open state, the controller may determine whether the slow charging port cover is in the open state. Alternatively, the controller may determine whether the received signal transmitted by the second port cover sensing unit is a second open signal or a second closing signal. When it is determined that the received signal is the second open signal, it is determined that the slow charging port cover is in the open state. When it is determined that the received signal is the second closing signal, it is determined that the slow charging port cover is in the close state.

When the controller determines that the quick charging port cover is not in the open state, and the slow charging port cover is also not in the open state, that is to say, when the controller receives the first closing signal and the second closing signal at the same time, it indicates that, currently, both the quick charging port cover and the slow charging port cover are not open, and both the quick charging port cover and the slow charging port cover will be locked.

The controller may execute step 301 so as to execute step 302 upon receiving the charging port cover unlocking instruction after receiving the first closing signal and the second closing signal at the same time. After the first closing signal and the second closing signal are received at the same time, step 303 is executed when the charging port cover unlocking instruction is not received.

Step 308, transmitting a first locking instruction to the first port cover locking unit.

When it is determined that the slow charging port cover is in the open state, the quick charging port cover needs to be locked at this time. The controller may then transmit the first locking instruction to the first port cover locking unit such that the first port cover locking unit, upon receiving the first locking instruction, controls the quick charging port cover to be in a locked state. As an example, continuing to take the example shown in step 303 above as an example, the process of sending the first locking instruction to the first port cover locking unit by the controller may include: controlling the third pin and the fourth pin of the first chip to output a first locking signal.

It needs to be noted that, according to the embodiment shown in FIG. 7, the process of controlling the slow charging port cover to be in the locked state includes: transmitting a second locking instruction to the second port cover locking unit. The process of controlling the quick charging port cover to be in the locked state includes: transmitting the first locking instruction to the first port cover locking unit, which will be described as an example. In addition, the above-mentioned step 305 may also be to determine whether the slow charging port cover is in the open state, and the corresponding step 307 is to determine whether the quick charging port cover is in the open state, and the embodiment of the present disclosure does not limit this. However, since one usually pursues a charge rate, i.e., one usually prefers to use the quick charging port when the conditions permit, therefore, in the method provided in the embodiment of the present disclosure, first determining whether the quick charging port cover is in the open state by the controller, improves the determination efficiency compared with first determining whether the slow charging port cover is in the open state.

In summary, embodiments of the present disclosure provide a control method for a vehicle charging port cover, by acquiring the open/close state of the quick charging port cover transmitted by the first port cover sensing unit and the open/close state of the slow charging port cover transmitted by the second port cover sensing unit, when it is determined that the quick charging port cover is in the open state, the second locking instruction is transmitted to the second port cover locking unit so that the second port cover locking unit controls the slow charging port cover to be in the locked state. Or when it is determined that the slow charging port cover is in the close state, the first locking instruction is transmitted to the first port cover locking unit so that the first port cover locking unit controls the quick charging port cover to be in the locked state. Therefore, when the quick charging port cover is in the open state, the slow charging port cover is in a locked state and cannot be opened. When the slow charging port cover is in the open state, the quick charging port cover is in a locked state and cannot be opened. It prevents the scenario that a quick charging port and a slow charging port can be connected to a charger at the same time, and avoids the misoperation of a quick charging port and a slow charging port being connected to a charger at the same time. Furthermore, the charging interruption of the electric vehicle caused by a quick charging port and a slow charging port being connected to a charger at the same time is avoided such that the unnecessary charging interruption of the electric vehicle is reduced, and the user experience is improved.

Figure 8:
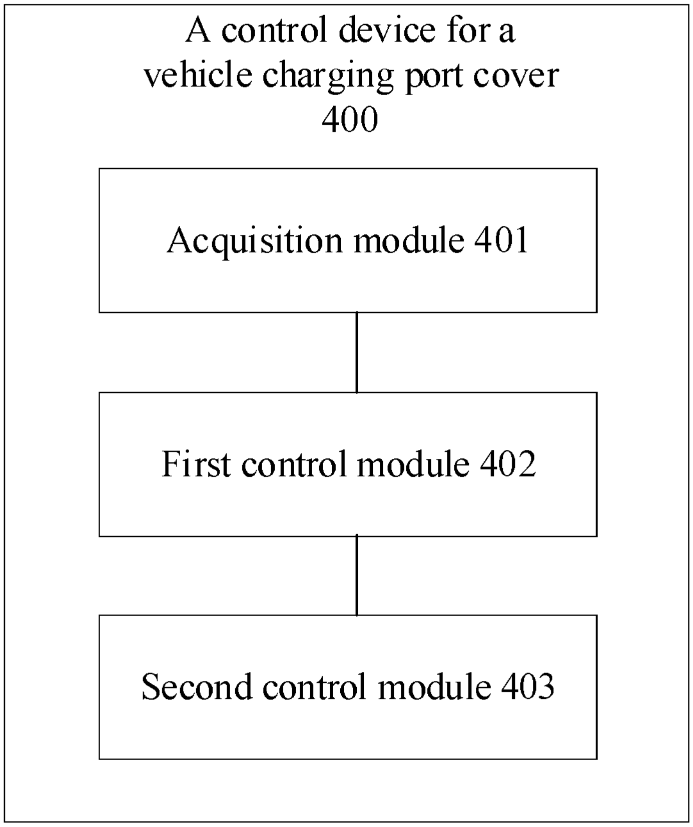
FIG. 8 is a schematic structural diagram of a control device for a vehicle charging port cover according to an embodiment of the present disclosure.

Referring to FIG. 8, it shows a schematic structural diagram of a control device for a vehicle charging port cover according to an embodiment of the present disclosure. The control device for a vehicle charging port cover is applied to a controller connected to the quick charging port cover and the slow charging port cover, respectively. The controller may be the controller in any of the systems shown in FIGS. 3 to 5. The control device for a vehicle charging port cover 400 includes:

- an acquisition module 401 for acquiring an open/close state of the quick charging port cover and an open/close state of the slow charging port cover;
- a first control module 402 for controlling the slow charging port cover to be in a locked state in the case where it is determined that the quick charging port cover is in an open state, and
- a second control module 403 for controlling the quick charging port cover to be in the locked state in the case where it is determined that the slow charging port cover is in the open state.

Alternatively, the controller is further connected to a first port cover locking unit and a second port cover locking unit, the first port cover locking unit is connected to a quick charging port cover, and the second port cover locking unit is further connected to a slow charging port cover;

The first control module is further used for transmitting a second locking instruction to the second port cover locking unit such that the second port cover locking unit, upon receiving the second locking instruction, controls the slow charging port cover to be in the locked state.

The second control module is further used for transmitting the first locking instruction to the first port cover locking unit such that the first port cover locking unit, upon receiving the first locking instruction, controls the quick charging port cover to be in the locked state.

Alternatively, the controller is further connected to a first port cover sensing unit and a second port cover sensing unit, the first port cover sensing unit is connected to a quick charging port cover, and the second port cover sensing unit is further connected to a slow charging port cover;

the first control module is further configured to determine that the quick charging port cover is in the open state when the first open signal is received, and the first open signal is a signal transmitted to the controller by the first port cover sensing unit when it is detected that the quick charging port cover is in the open state;

the second control module is further used for determining that the slow charging port cover is in the open state when receiving the second open signal, and the second open signal is a signal transmitted to the controller by the second port cover sensing unit when it is detected that the slow charging port cover is in the open state.

Alternatively, the device further includes:

a sending module for sending a first unlocking instruction to the first port cover locking unit and sending a second unlocking instruction to the second port cover locking unit when the charging port cover unlocking instruction is received; and when the charging port cover unlocking instruction is not received, sending a first locking instruction to the first port cover locking unit and a second locking instruction to the second port cover locking unit, wherein the charging port cover unlocking instruction is used for indicating that currently the electric vehicle can be charged.

Alternatively, the sending module is further used for:

after receiving the first closing signal and the second closing signal at the same time, when receiving the charging port cover unlocking instruction, sending the first unlocking instruction to the first port cover locking unit and sending the second unlocking instruction to the second port cover locking unit; and after receiving the first closing signal and the second closing signal at the same time, when not receiving the charging port cover unlocking instruction, sending a first locking instruction to the first port cover locking unit and sending a second locking instruction to the second port cover locking unit.

The first closing signal is a signal transmitted to the controller by the first port cover sensing unit when it is detected that the quick charging port cover is in a close state, and the second closing signal is a signal transmitted to the controller by the second port cover sensing unit when it is detected that the slow charging port cover is in the close state.

In view of the above, an embodiment of the present disclosure provides a control device for a vehicle charging port cover that acquires the open/close state of the quick charging port cover and the open/close state of a slow charging port cover via the acquisition module. Therefore, the first control module controls the slow charging port cover to be in the locked state when it is determined that the quick charging port cover is in the open state. The second control module controls the quick charging port cover to be in a locked state when it is determined that the slow charging port cover is in the open state. Therefore, when the quick charging port cover is in the open state, the slow charging port cover is in a locked state and cannot be opened. When the slow charging port cover is in the open state, the quick charging port cover is in a locked state and cannot be opened. It prevents the scenario that a quick charging port and a slow charging port can be connected to a charger at the same time, and avoids the misoperation of a quick charging port and a slow charging port being connected to a charger at the same time. Furthermore, the charging interruption of the electric vehicle caused by a quick charging port and a slow charging port being connected to a charger at the same time is avoided such that the unnecessary charging interruption of the electric vehicle is reduced, and the user experience is improved.

An embodiment of the present disclosure also provides an electric vehicle that includes a fast-charging port, a quick charging port cover, a slow charging port, a slow charging port cover, and the system shown in any of FIGS. 3-5 described above. The quick charging port cover is used to shield the quick charging port. The slow charging port cover is used to shield the slow charging port.

In an embodiment of the present disclosure, the above-mentioned components and parts in the hardware structure of the vehicle are merely examples. In practical applications, components and parts in the hardware structure may be added or deleted according to requirements.

The embodiments of the apparatus described above are merely schematic, wherein the units illustrated as separate parts may or may not be physically separated, and the parts shown as units may or may not be physical units, i.e., they may be located in one place, or may also be distributed over a plurality of network units. Some or all of the modules may be selected to achieve the objects of the embodiment schemes according to actual needs. A person of ordinary skills in the art could understand and implement the present disclosure without involving any inventive efforts.

Various part embodiments of the present disclosure may be implemented in hardware, or in a software module running on one or more processors, or in a combination thereof. Those skilled in the art should understand that a microprocessor or a digital signal processor (DSP) may be used in practice to implement some or all of the functions of some or all of the components of computing processing equipment according to the embodiments of the present disclosure. The present disclosure may also be embodied as equipment or a device program (e.g., a computer program and a computer program product) for executing a portion or all of the method described herein. Such a program implementing the present disclosure may be stored on a computer-readable medium or may be in the form of one or more signals. Such signals may be downloaded from an Internet website, provided on a carrier signal, or provided in any other form.

Figure 9:
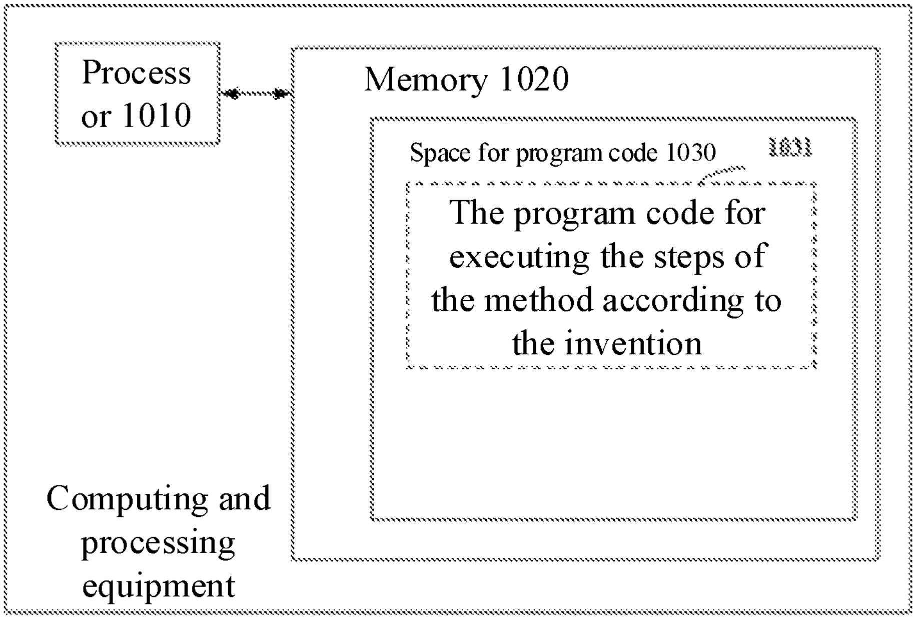
FIG. 9 schematically shows a block diagram of a computing and processing equipment for executing a method according to the present disclosure.
Figure 10:
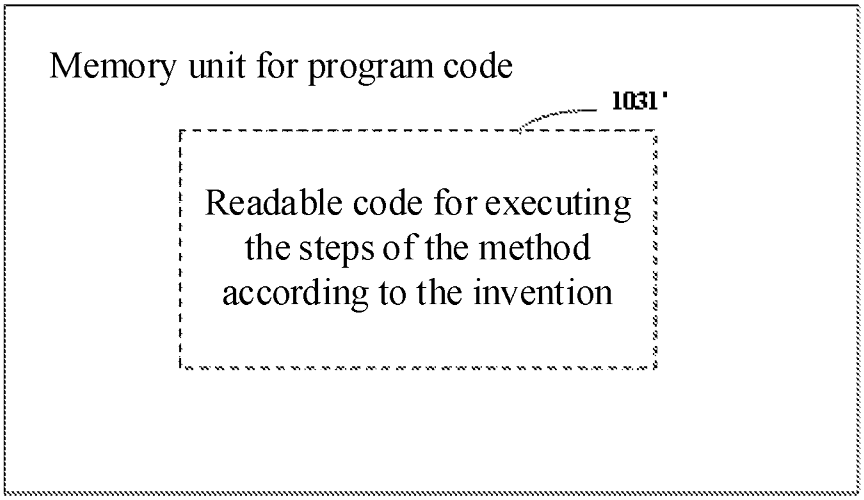
FIG. 10 schematically shows a memory unit for holding or carrying a program code implementing a method according to the present disclosure.

For example, FIG. 9 shows computing processing equipment that may implement a method in accordance with the present disclosure. The computing processing equipment conventionally includes a processor 1010 and a computer program product or computer-readable medium in the form of a memory 1020. The memory 1020 may be an electronic memory such as flash memory, (electrically erasable programmable read only), EPROM, hard disk, or ROM. The memory 1020 has a storage space 1030 for a program code 1031 for performing any of the method steps of the above method. For example, the storage space 1030 for the program code may include each program code 1031 for implementing various steps in the above method, respectively. The program codes may be read from or written into one or more computer program products. These computer program products comprise a program code carrier such as a hard disk, a compact disc (CD), a memory card, or a floppy disk. Such a computer program product is usually a portable or fixed storage unit as described with reference to FIG. 10. The storage unit may have storage segments, storage space, etc. arranged similarly to the memory 1020 in the computing processing equipment of FIG. 9. The program code may, for example, be compressed in a suitable form. Generally, the storage unit includes a computer readable code 1031', i.e., a code that can be read by a processor, such as, for example, 1010. These codes, when run by computing processing equipment, cause the computing processing equipment to perform the various steps in the method described above.

The above descriptions are only preferred embodiments of the present disclosure, and are not intended to limit the present disclosure. Any modifications, equivalent replacements, improvements, etc. made within the spirit and principles of the present disclosure shall be included in the scope of the present disclosure.

The invention claimed is:

1. A control method for a vehicle charging port cover, wherein the method is applied to a controller connected to a quick charging port cover and a slow charging port cover, and the method comprises:

acquiring an open/close state of the quick charging port cover and an open/close state of the slow charging port cover;

controlling the slow charging port cover to be in a locked state in a case where it is determined that the quick charging port cover is in an open state; and controlling the quick charging port cover to be in the locked state in a case where it is determined that the slow charging port cover is in the open state;

wherein the controller is further connected to a first port cover locking unit and a second port cover locking unit, the first port cover locking unit is connected to the quick charging port cover, and the second port cover locking unit is further connected to the slow charging port cover; and before the step of acquiring an open/close state of the quick charging port cover and an open/close state of the slow charging port cover, the method further comprises: sending a first unlocking instruction to the first port cover locking unit and sending a second unlocking instruction to the second port cover locking unit on the condition that a charging port cover unlocking instruction is received; and on the condition that the charging port cover unlocking instruction is not received, sending a first locking instruction to the first port cover locking unit and a second locking instruction to the second port cover locking unit, wherein the charging port cover unlocking instruction is used for indicating that currently an electric vehicle is capable of being charged.

2. The method according to claim 1, wherein the step of controlling the slow charging port cover to be in a locked state comprises: transmitting the second locking instruction to the second port cover locking unit so that the second port cover locking unit controls the slow charging port cover to be in the locked state when receiving the second locking instruction; and the step of controlling the quick charging port cover to be in the locked state comprises: transmitting the first locking instruction to the first port cover locking unit so that the first port cover locking unit controls the quick charging port cover to be in the locked state when receiving the first locking instruction.

3. The method according to claim 1, wherein the controller is further connected to a first port cover sensing unit and a second port cover sensing unit, the first port cover sensing unit is connected to the quick charging port cover, and the second port cover sensing unit is further connected to the slow charging port cover;

determining that the quick charging port cover is in an open state comprises: determining that the quick charging port cover is in the open state on the condition that a first open signal is received, wherein the first open signal is a signal transmitted to the controller by the first port cover sensing unit when it is detected that the quick charging port cover is in the open state; and determining that the slow charging port cover is in the open state comprises: determining that the slow charging port cover is in the open state on the condition that a second open signal is received, wherein the second open signal is a signal transmitted to the controller by the second port cover sensing unit when it is detected that the slow charging port cover is in the open state.

4. The method according to claim 1, wherein the step of sending a first unlocking instruction to the first port cover locking unit and sending a second unlocking instruction to the second port cover locking unit on the condition that a charging port cover unlocking instruction is received comprises:

after receiving a first closing signal and a second closing signal at the same time, sending the first unlocking instruction to the first port cover locking unit and sending the second unlocking instruction to the second port cover locking unit on the condition that the charging port cover unlocking instruction is received; and on the condition that the charging port cover unlocking instruction is not received, sending a first locking instruction to the first port cover locking unit and a second locking instruction to the second port cover locking unit further comprises:

after receiving the first closing signal and the second closing signal at the same time, on the condition that the charging port cover unlocking instruction is not received, sending the first locking instruction to the first port cover locking unit and the second locking instruction to the second port cover locking unit;

wherein the first closing signal is a signal transmitted to the controller by the first port cover sensing unit when it is detected that the quick charging port cover is in a close state, and the second closing signal is a signal transmitted to the controller by the second port cover sensing unit when it is detected that the slow charging port cover is in the close state.

5. A control system for a vehicle charging port cover, wherein the system comprises:

a controller, and a first port cover sensing unit, a first port cover locking unit, a second port cover sensing unit, and a second port cover locking unit respectively connected to the controller;

wherein the first port cover sensing unit is connected to a quick charging port cover, and is used for transmitting a first open signal to the controller on the condition that the quick charging port cover is in an open state;

the first port cover locking unit is connected to the quick charging port cover, and is used for controlling the quick charging port cover to be in a locked state on the condition that a first locking instruction transmitted by the controller is received;

the second port cover sensing unit is connected to a slow charging port cover, and is used for detecting an open/close state of the slow charging port cover and transmitting the open/close state of the slow charging port cover to the controller;

the second port cover locking unit is connected to the slow charging port cover, and is used for transmitting a second open signal to the controller on the condition that the slow charging port cover is in an open state; and the controller is used for transmitting a second locking instruction to the second port cover locking unit on the condition that the first open signal is received, and for transmitting a first locking instruction to the first port cover locking unit on the condition that the second open signal is received;

wherein the first port cover locking unit comprises a fifth resistor, and a first charging port cover motor connected to the quick charging port cover, wherein the first charging port cover motor is connected in parallel to the fifth resistor, and is used for rotating in a first direction for a specified duration to control the quick charging port cover to be in an unlocked state on the condition that a first unlocking instruction is received, and for rotating in a second direction for a specified duration to control the quick charging port cover to be in a locked state on the condition that the first locking instruction is received, wherein the first direction and the second direction are opposite; and the second port cover locking unit comprises a sixth resistor, and a second charging port cover motor connected to the slow charging port cover, wherein the second charging port cover motor is connected in parallel to the sixth resistor, and is used for rotating in the first direction for a specified duration to control the slow charging port cover to be in the unlocked state on the condition that a second unlocking instruction is received, and for rotating in the second direction for a specified duration to control the slow charging port cover to be in the locked state on the condition that the second locking instruction is received.

6. The system according to claim 5, wherein the first port cover sensing unit comprises: a first resistor, a second resistor, and a first micro-switch clamped with the quick charging port cover, wherein the first micro-switch is connected in parallel to the first resistor, and a main circuit at one end of the first micro-switch is grounded, and the second resistor is located on the main circuit at the other end of the first micro-switch, and the open/close state of the quick charging port cover is transmitted to the controller via the main circuit at the other end of the first micro-switch; and the second port cover sensing unit comprises: a third resistor, a fourth resistor, and a second micro-switch clamped with the slow charging port cover, wherein the second micro-switch is connected in parallel to the third resistor, and the main circuit at one end of the second micro-switch is grounded, and the fourth resistor is located on the main circuit at the other end of the second micro-switch, and the open/close state of the slow charging port cover is transmitted to the controller via the main circuit at the other end of the second micro-switch.

7. An electric vehicle, wherein the electric vehicle comprises the control system for a vehicle charging port cover according to claim 5.

8. A non-volatile computer-readable medium, wherein the computer-readable medium stores a computer-readable code, and when the computer-readable code is executed, the computing processing device executes the control method for a vehicle charging port cover according to claim 1.

9. The non-volatile computer-readable medium according to claim 8, wherein the controller is further connected to a first port cover locking unit and a second port cover locking unit, the first port cover locking unit is connected to the quick charging port cover, and the second port cover locking unit is further connected to the slow charging port cover;

the operation of controlling the slow charging port cover to be in a locked state comprises: transmitting a second locking instruction to the second port cover locking unit so that the second port cover locking unit controls the slow charging port cover to be in the locked state when receiving the second locking instruction; and the operation of controlling the quick charging port cover to be in the locked state comprises: transmitting a first locking instruction to the first port cover locking unit so that the first port cover locking unit controls the quick charging port cover to be in the locked state when receiving the first locking instruction.

10. The non-volatile computer-readable medium according to claim 8, wherein the controller is further connected to a first port cover sensing unit and a second port cover sensing unit, the first port cover sensing unit is connected to the quick charging port cover, and the second port cover sensing unit is further connected to the slow charging port cover;

determining that the quick charging port cover is in an open state comprises: determining that the quick charging port cover is in the open state on the condition that a first open signal is received, wherein the first open signal is a signal transmitted to the controller by the first port cover sensing unit when it is detected that the quick charging port cover is in the open state; and determining that the slow charging port cover is in the open state comprises: determining that the slow charging port cover is in the open state on the condition that a second open signal is received, wherein the second open signal is a signal transmitted to the controller by the second port cover sensing unit when it is detected that the slow charging port cover is in the open state.

11. The non-volatile computer-readable medium according to claim 9, wherein before the operation of acquiring an open/close state of the quick charging port cover and an open/close state of the slow charging port cover, the method further comprises:

sending a first unlocking instruction to the first port cover locking unit and sending a second unlocking instruction to the second port cover locking unit on the condition that a charging port cover unlocking instruction is received; and on the condition that the charging port cover unlocking instruction is not received, sending a first locking instruction to the first port cover locking unit and a second locking instruction to the second port cover locking unit, wherein the charging port cover unlocking instruction is used for indicating that currently an electric vehicle is capable of being charged.

12. The non-volatile computer-readable medium according to claim 11, wherein the operation of sending a first unlocking instruction to the first port cover locking unit and sending a second unlocking instruction to the second port cover locking unit on the condition that a charging port cover unlocking instruction is received comprises:

after receiving a first closing signal and a second closing signal at the same time, sending the first unlocking instruction to the first port cover locking unit and sending the second unlocking instruction to the second port cover locking unit on the condition that the charging port cover unlocking instruction is received; and on the condition that the charging port cover unlocking instruction is not received, sending a first locking instruction to the first port cover locking unit and a second locking instruction to the second port cover locking unit further comprises:

after receiving the first closing signal and the second closing signal at the same time, on the condition that the charging port cover unlocking instruction is not received, sending the first locking instruction to the first port cover locking unit and the second locking instruction to the second port cover locking unit;

wherein the first closing signal is a signal transmitted to the controller by the first port cover sensing unit when it is detected that the quick charging port cover is in a close state, and the second closing signal is a signal transmitted to the controller by the second port cover sensing unit when it is detected that the slow charging port cover is in the close state.

* * * * *